United States Patent
Barry

(10) Patent No.: US 7,219,436 B1
(45) Date of Patent: May 22, 2007

(54) UNIVERSAL HAND GUARD FOR A HACKSAW

(76) Inventor: Henry B. Barry, 228 Cumquat Rd., NE., Lake Placid, FL (US) 33852

( * ) Notice: Subject to any disclaimer, the term of this patent is extended or adjusted under 35 U.S.C. 154(b) by 473 days.

(21) Appl. No.: 10/751,231

(22) Filed: Jan. 2, 2004

(51) Int. Cl.
*B26B 29/00* (2006.01)
*B27B 21/00* (2006.01)

(52) U.S. Cl. .............................. 30/507; 30/514; 30/295

(58) Field of Classification Search .................. 30/507, 30/514, 295, 504; D8/96, 95
See application file for complete search history.

(56) References Cited

U.S. PATENT DOCUMENTS

| | | | |
|---|---|---|---|
| 1,078,821 A | 11/1913 | Biggs | |
| 1,517,827 A | 12/1924 | Grado | |
| 1,852,616 A * | 4/1932 | Kittle | 30/508 |
| 2,660,974 A | 12/1953 | Swain | |
| 3,009,497 A | 11/1961 | Lorch | |
| 3,727,655 A | 4/1973 | Garcher | |
| 3,848,649 A | 11/1974 | Wanless | |
| 4,592,145 A | 6/1986 | Egan et al. | |
| D325,506 S * | 4/1992 | Michas et al. | D8/96 |
| 5,325,597 A | 7/1994 | Clifton, Jr. | |
| 5,555,627 A * | 9/1996 | Hartzell | 30/509 |
| D473,445 S | 4/2003 | Snider | |

* cited by examiner

*Primary Examiner*—Jason Prone
(74) *Attorney, Agent, or Firm*—Charles J. Prescott

(57) ABSTRACT

A resilient hand guard for protecting the hand of a hacksaw user including a flat shield formed of resilient non-metallic or elastomeric material having a height equal to that of the frame and a width at least as great as a projected frontal width of a user's hand when grasped around the handle. The shield has an elongated notch extending downwardly from an upper margin having a width and length sufficient to be fitted around and receive support from an upper portion of the frame just forwardly of the handle. The shield also has a mounting aperture positioned directly below the notch sized to fit over and receive support from a threaded end of an elongated rear blade tensioning support of the frame. The shield has sufficient resiliency for a side portion thereof to be protectively deflected around the hand upon inadvertent impact against an object during use of the hacksaw.

7 Claims, 3 Drawing Sheets

FIG 3
FIG 4
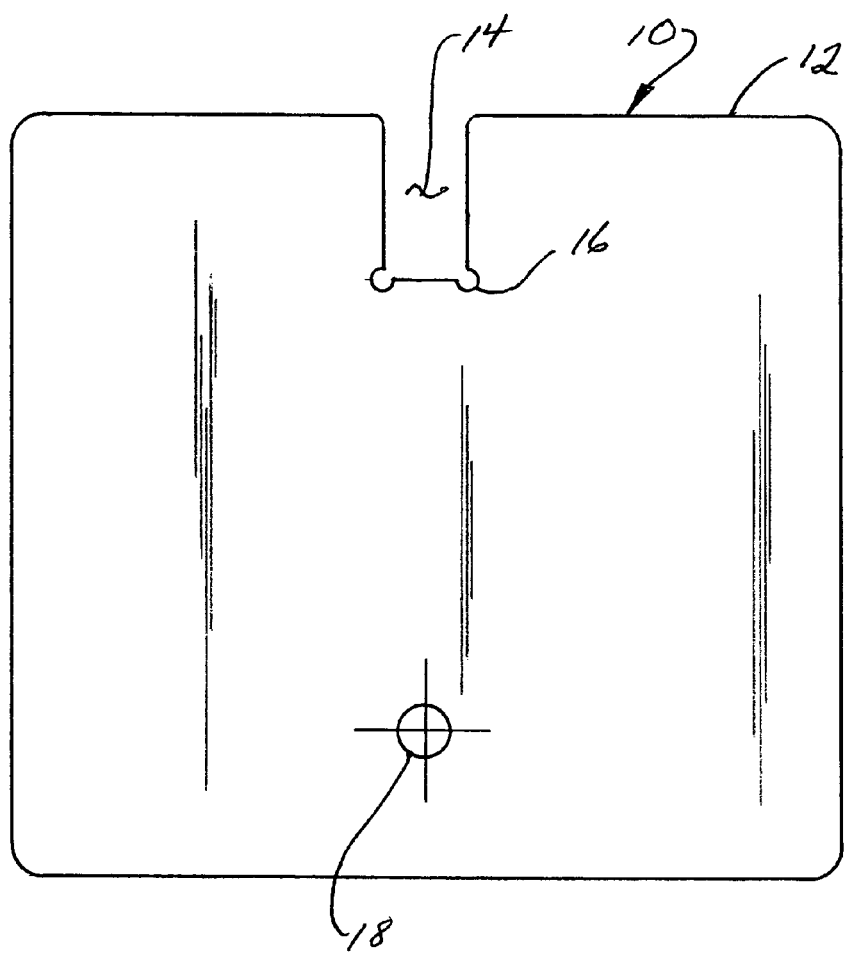
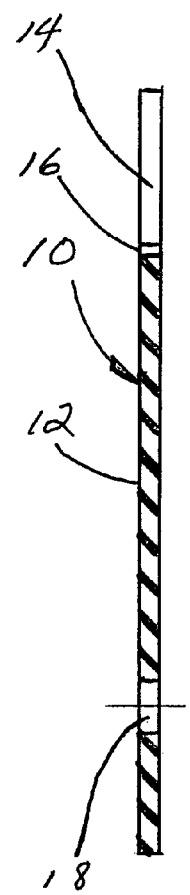

UNIVERSAL HAND GUARD FOR A HACKSAW

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to protective hand guards for manual tools and more particularly to a resilient universal hand guard for a hacksaw to protect the operator's hand from impact against another object during each forwardly cutting stroke of the hacksaw.

A hacksaw in use is well known to carry the risk of causing the user of the hacksaw minor or sever hand damage due to impact against an object during the forwardly cutting motion of the hacksaw. Such an injury occurs in part because of the relatively small size of the hacksaw and the type of material typically cut by the use of a hacksaw, i.e., metal objects of various sizes and shapes. Additionally, hand injury may occur when a blade is overly stressed or bound in the work substrate causing the blade to either be dislodged or broken at which point the frame of the hacksaw may be unexpected driven forwardly into the work substrate injuring the hand of the user.

2. Description of Related Art

A number of prior art devices have been previously patented which are in some fashion intended to remedy this defect in hacksaw design and use. In U.S. Pat. No. 1,078,821, Biggs teaches a hand guard for steel hacksaws disclosing a rigid arcuately formed plate attachable to the upper frame just forwardly of the handle and to the rearwardly frame just rearwardly of and associated with the threaded hacksaw blade tensioning member thereof.

De Grado, in U.S. Pat. No. 1,517,827 teaches another hacksaw frame having a rod like protective hand guard which extends in front of the user's knuckles but does not appear to protect the larger portion of the hand of the user.

Another hacksaw guard is disclosed in U.S. Pat. No. 2,660,974 to Swain which attaches to the frame of the hacksaw just forwardly of the handle and teaches a one-piece arcuately formed hand guard, each symmetric half of which has basket-like lobes for receiving and protecting the user's hand.

Still another hand guard for a hacksaw is disclosed by Lorch in U.S. Pat. No. 3,009,497 teaching an elongated trapezoidally shaped guard formed of sheet material such as flexible leather or leather-like substance which is formed into somewhat of a trough-like structure which surrounds the handle of the hacksaw and the user's hand from below during hacksaw use. A separate forwardly extending strap serves to at least partially attach the structure to the hacksaw at the rear of the frame thereof.

Garcher, in U.S. Pat. No. 3,727,655, teaches yet another guard shield for hacksaws which is formed of curved rigid plastic material having spaced central openings to receive the legs of a U-shaped clamp or clip that attaches the shield to the frame of the hacksaw.

Another safety device for hacksaws invented by Wanless in U.S. Pat. No. 3,848,649 teaches a sheet metal shield clamped onto the hacksaw frame at the handle end of the hacksaw. The shield is arcuately formed curving backward around the knuckles and back of the hand of the user while grasping the handle during use of the hacksaw.

Egan teaches yet another hacksaw hand guard in U.S. Pat. No. 4,592,145 in the form of very sophisticated arcuately formed cup-like receptacles for receiving and protecting the fingers and knuckles of the hand of the user. Clifton teaches yet another hacksaw hand guard in U.S. Pat. No. 5,325,597 in the form of a two-piece assembly formed of molded rigid plastic or metal material which clamps to the frame of a uniquely configured hacksaw forwardly of the handle portion thereof.

A design of a hacksaw hand guard is disclosed by Snider in U.S. Pat. D473,445 which is unique configured to a uniquely structured frame and handle portion of a hacksaw.

The present invention teaches an extremely simple, universal hacksaw hand protecting device which is attachable to virtually any standard hacksaw by providing a resilient flat shield formed preferably of semi-rigid elastomeric or plastic material and having an upper notch and a lower aperture which cooperate to securely engage with the structure of the frame of the hacksaw in a most simplistic and economical manner.

BRIEF SUMMARY OF THE INVENTION

This invention is directed to a resilient hand guard for protecting the hand of a hacksaw user. The hand guard includes a semi-rigid or resilient flat shield formed of resilient non-metallic or elastomeric material having a height generally equal to that of the frame or handle and a width at least as great as a projected frontal width of a user's hand when grasped around the handle. The shield has an elongated notch extending downwardly along a central axis of the shield from an upper margin thereof. The notch has a width and length sufficient to be fitted around and receive support from an upper portion of the frame at a point in proximity to and forward of the handle. The shield also has a mounting aperture positioned directly below the notch and spaced above a lower margin of the shield sized to fit over and receive support from a threaded end of an elongated rear blade tensioning support held within a lower corner of the frame. The shield is also positioned in close proximity along the upright central axis thereof against a rear upright frame portion which extends between the notch and mounting aperture. The shield has sufficient resiliency for a side portion thereof to be protectively deflected around a corresponding portion of the hand upon inadvertent impact against an object during use of the hacksaw.

It is therefore an object of this invention to provide a universal hand guard for a hacksaw which is economical to manufacture and easily installable onto virtually any conventional hacksaw.

Yet another object of this invention is to provide a semi-rigid flat shield formed of resilient, preferably non-metallic elastomeric or plastic material which is easily attachable to the rear frame portion of a hacksaw just forwardly of the handle for protecting the hand of the user from object impact.

Still another object of this invention is to provide a universal hand guard for hacksaws which protects the user's hand from impact against objects and which is formed of a flat rectangular of semi-rigid or elastomeric material of a most economical and easily adaptable nature.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 3 is a front elevation view of the preferred embodiment of the invention.

FIG. 4 is a side elevation section view of FIG. 3.

DETAILED DESCRIPTION OF THE INVENTION

Figure 1:
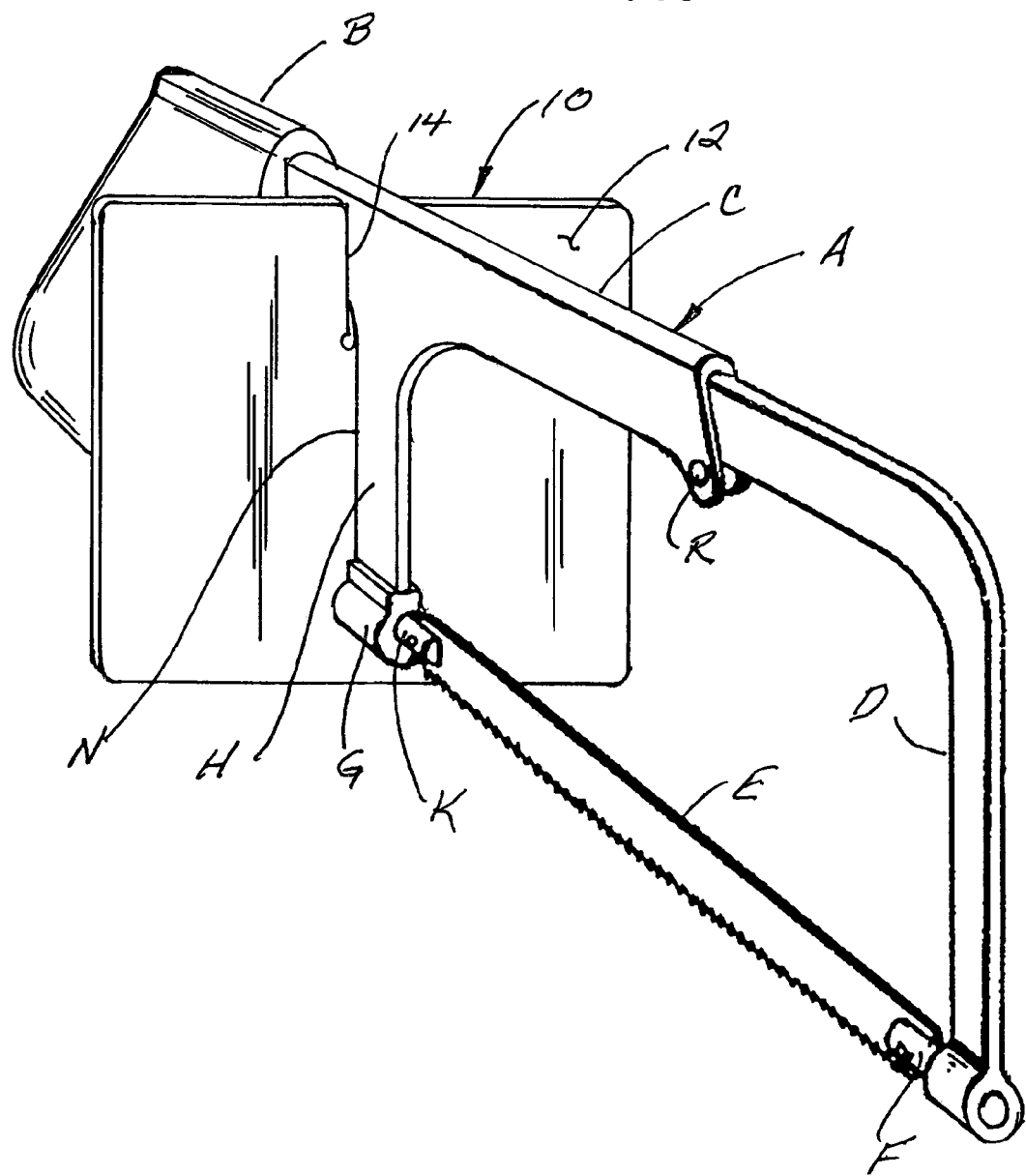
FIG. 1 is a perspective view of a conventional hacksaw with the invention attached thereto in operative position.
Figure 2:
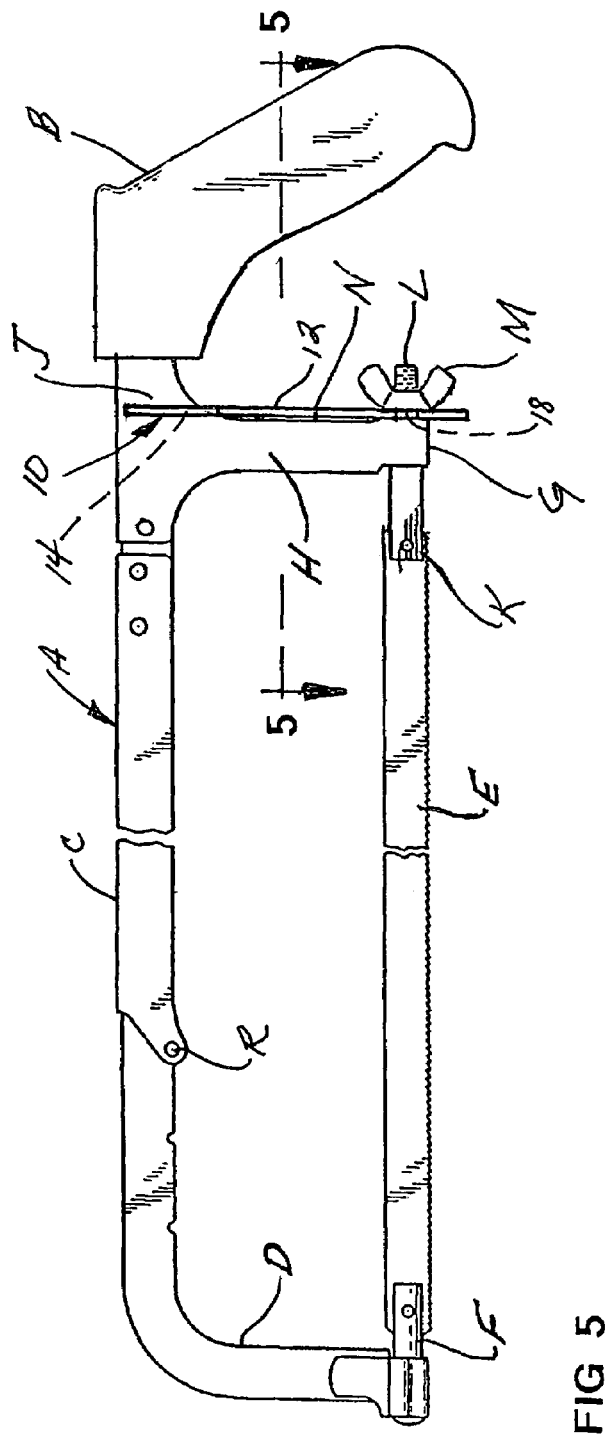
FIG. 2 is a side elevation view of FIG. 1.
Figure 5:
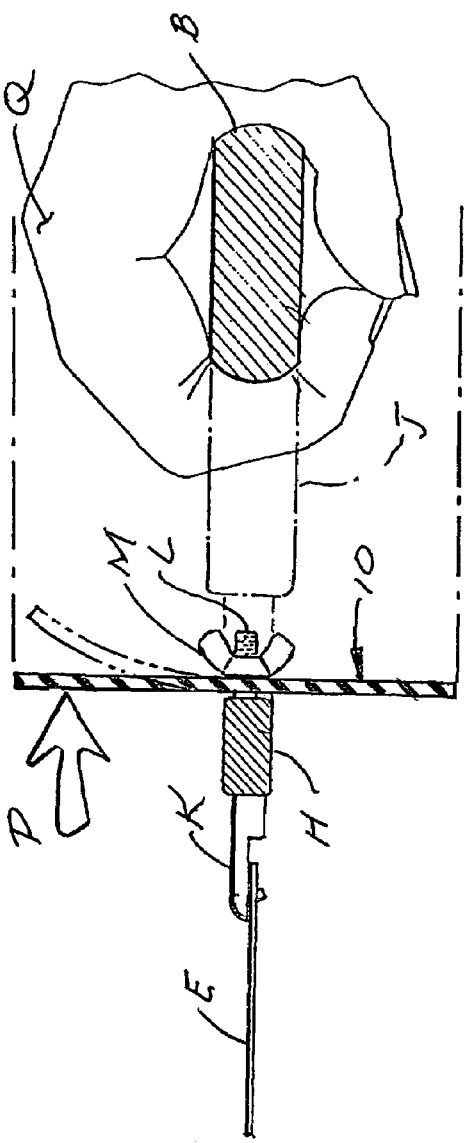
FIG. 5 is a section view in the direction of arrows 5—5 in FIG. 2 also showing the general positioning of the user's hand.

Referring now to the drawings, the invention is there shown generally at numeral 10 in FIGS. 3 and 4 and in its operative position attached to a conventional hacksaw shown generally at letter A in FIGS. 1, 2 and 5.

As best seen in FIGS. 3 and 4, the invention 10 includes a generally flat rectangular shaped shield 12 formed of semi-rigid or resilient elastomeric material 12. This shield 12 is preferably formed of commercial grade Neoprene having a thickness of Neoprene having a thickness in the range of about 1/8" and a durometer reading of in the range of about 60 indicating its relatively stiff resilience to provide a cooperative flexible yet protective feature of this invention. An upper notch 14 is formed extending downwardly from the upper margin of the shield 12. Corner reliefs 16 resist tearing of the neoprene material during its installation, flexing during use and removal from a hacksaw A, the details of which will be described more fully herebelow. Positioned directly beneath and along a central upright axis of the shield 12 is an aperture 18 which is particularly sized for interengagement onto the threaded end L of the hacksaw blade-tensioning member K also described in more detail herebelow. The preferred size of the flexible shield 12 incorporates a height and width being about 5" and more specifically the height being 4⅝" and the width being 5".

A typical hacksaw A includes an open perimeter frame comprising a rear portion C and interconnected front portion D pivotally connected together at Ft to facilitate blade E installation. The forwardly portion of the blade E is connected to a blade attaching member F while the rear of the blade E is attached to an elongated threaded tensioning member K supported within a passageway through a lower rearward corner portion G of the rear H of the hacksaw frame C. This corner portion G has an elongated passageway formed therethrough for slidably supporting the tensioning member K. A handle B is attached to a frame portion J. The elongated blade-tensioning member K has a rearwardly threaded portion L onto which a wing nut M is attached and, when suitably tensioned against corner portion G, secures the blade E in operative engagement.

The hand guard 10 is easily attached to and removed from the hacksaw A by simply removing the wing nut M, inserting the threaded end L through aperture 18 while simultaneously resiliently urging notch 14 into surrounding engagement with frame portion J and against rear edge N just forwardly of handle B. Thereafter, the wing nut M is threadably resecured onto the threaded portion L of the rear blade-tensioning member K to resecure the blade E in its operative position and also to secure the hand guard 10 in its operative position as shown.

The overall sizing of the flexible shield 12 is such that the overall height is generally equal to the height of the frame C of the hacksaw A and the width thereof as best seen in FIG. 5, being generally at least equal to the projected width of the user's hand and knuckle portion Q, the lateral dimension being symmetric in either direction about an upright centerline to accommodate both right-handed and left-handed users of the hacksaw A.

Should the blade E break or become detached due to binding or overly forceful use of the hacksaw A or should other slippage or inadvertent moving of the hacksaw A be encountered, the likelihood of impact of an object which would otherwise cause injury to the handle grasping hand of the user is deflected and prevented from hand impact as best seen in FIG. 5. The object being struck will impact the hand guard 10 in the direction of arrow P causing it to deflect into an arcuately rearwardly bent position shown in phantom to partially deflect the blow and to protect the hand from injury.

Note importantly that the simplicity of a flat resilient shield 10 accommodates and is attachable to most, if not all, conventional hacksaw designs.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A resilient universal single piece hand guard for protecting the hand of the user of a hacksaw having a handle, a frame and a blade, said hand guard comprising:

a flexible flat generally rectangular shield formed of a single piece of resilient material having a height generally equal to that of the frame or handle and having a width at least as great as a projected frontal width of a user's hand when grasped around the handle during hacksaw use;

said shield having an elongated notch extending downwardly from an upper margin thereof, said notch having a width and length sufficient to be fitted around and receive support from an upper portion of the rear of the frame at a point in proximity to and forward of the handle;

said shield also having a mounting aperture positioned directly below said notch and spaced above a lower margin of said shield and being sized to fit over and receive support from a threaded end of an elongated rear blade tensioning support held within a lower corner of the frame;

said shield extending vertically against a rear upright portion of the frame which extends between said notch and said mounting aperture;

said shield being held in operative position with respect to the frame only by the resilient fit of said notch around the frame and a threaded nut engaged with the threaded end of the rear blade tensioning member against a portion of said shield surrounding said mounting aperture;

said shield having sufficient resiliency for a portion thereof to be protectively deflected around a corresponding portion of the hand upon impact against an object during use of the hacksaw.

2. A universal hand guard as set forth in claim 1, wherein:

said resilient material is sheet elastomer.

3. A universal hand guard as set forth in claim 2, wherein:

said shield is generally rectangular and has a thickness in the range of about 1/8" and a width and a height of about 5".

4. A universal hand guard as set forth in claim 2, wherein:

said elastomer is neoprene.

5. A universal hand guard as set forth in claim 4, wherein:

said neoprene has a durometer reading of in the range of about 60.

6. A universal hand guard as set forth in claim 2, wherein:

said resilient material has a thickness in the range of about 1/8".

7. A universal hand guard as set forth in claim 6, wherein:

said shield has a width and a height of about 5".

\* \* \* \* \*